(12) United States Patent
Dickerson

(10) Patent No.: US 8,096,607 B2
(45) Date of Patent: Jan. 17, 2012

(54) VEHICLE BODY WITH A CURVED METAL PLATE FLOOR

(76) Inventor: Alan William Dickerson, Mount Eliza Vic (AU)

( * ) Notice: Subject to any disclaimer, the term of this patent is extended or adjusted under 35 U.S.C. 154(b) by 460 days.

(21) Appl. No.: 11/887,641

(22) PCT Filed: Mar. 30, 2006

(86) PCT No.: PCT/AU2006/000427
§ 371 (c)(1),
(2), (4) Date: Apr. 21, 2009

(87) PCT Pub. No.: WO2006/102714
PCT Pub. Date: Oct. 5, 2006

(65) Prior Publication Data
US 2010/0264692 A1    Oct. 21, 2010

(30) Foreign Application Priority Data
Mar. 30, 2005   (AU) ................................ 2005901546

(51) Int. Cl.
*B60J 7/00* (2006.01)

(52) U.S. Cl. .................. 296/184.1; 296/183.2; 105/364

(58) Field of Classification Search ............... 296/182.1, 296/183.1, 183.2, 184.1; 105/406.1, 364
See application file for complete search history.

(56) References Cited

U.S. PATENT DOCUMENTS

| 3,713,400 A | 1/1973 | Teoli |
| 4,254,714 A | 3/1981 | Heap |

FOREIGN PATENT DOCUMENTS

| DE | 20318001 U1 | 5/2004 |
| EP | 345963 B1 | 12/1989 |
| EP | 1473189 A2 | 11/2004 |
| EP | 1488988 A1 | 12/2004 |
| FR | 2221034 A | 10/1974 |

OTHER PUBLICATIONS

International Search Report, PCT/AU2006/000427, dated Jun. 27, 2006.
Supplementary European Search Report, EP06721309, dated Feb. 5, 2009.

*Primary Examiner* — Joseph Pape
(74) *Attorney, Agent, or Firm* — Nixon Peabody LLP

(57) ABSTRACT

A system that attaches an edge-supported curved metal plate floor to a load carrying body of a vehicle, such as a truck or rail wagon, is disclosed. The attachment system includes a series of tensile members that are connected directly or indirectly at opposite ends to the plate floor and the body of the vehicle. The tensile members principally transfer forces from the floor plate to the body.

19 Claims, 7 Drawing Sheets

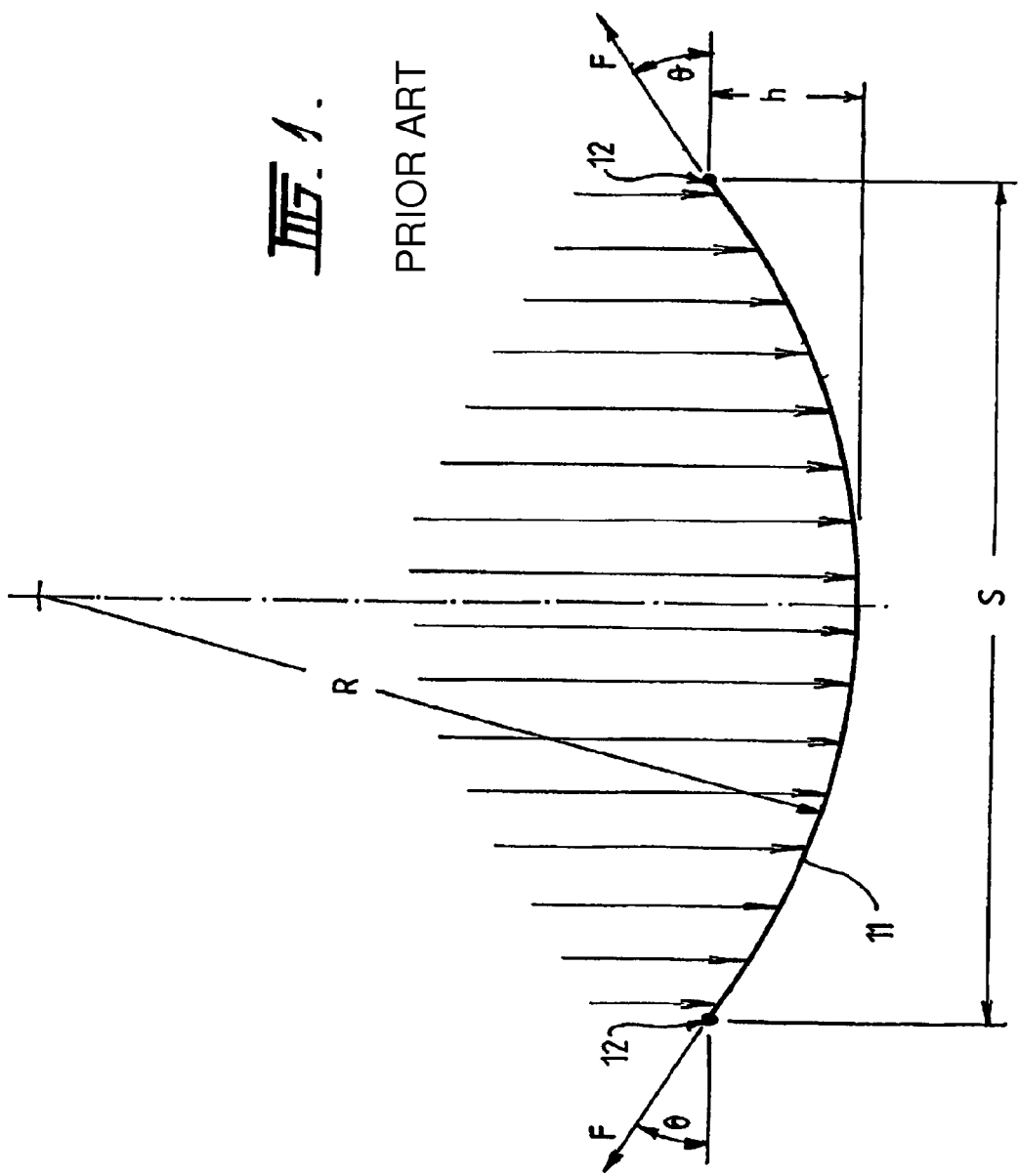

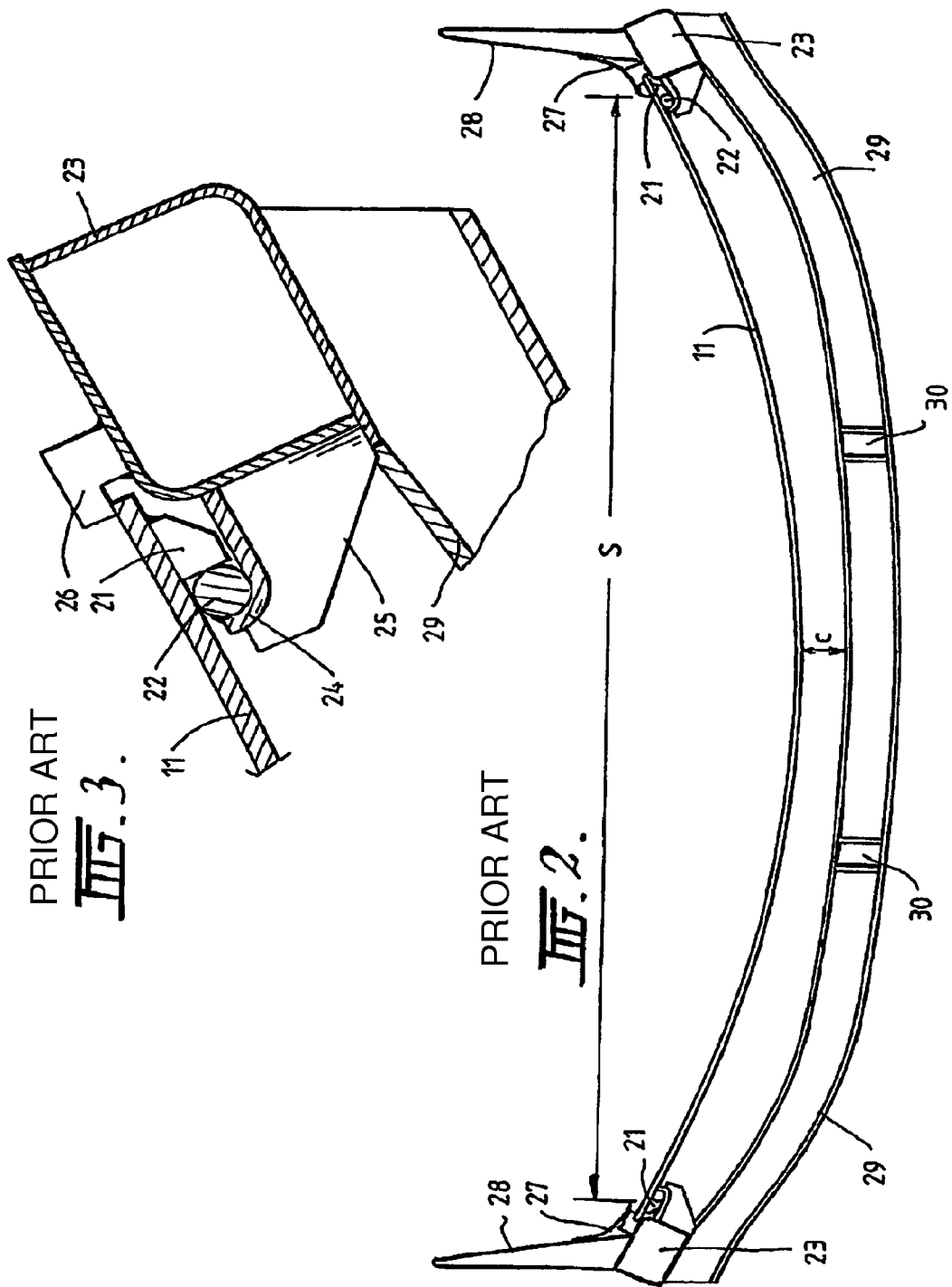

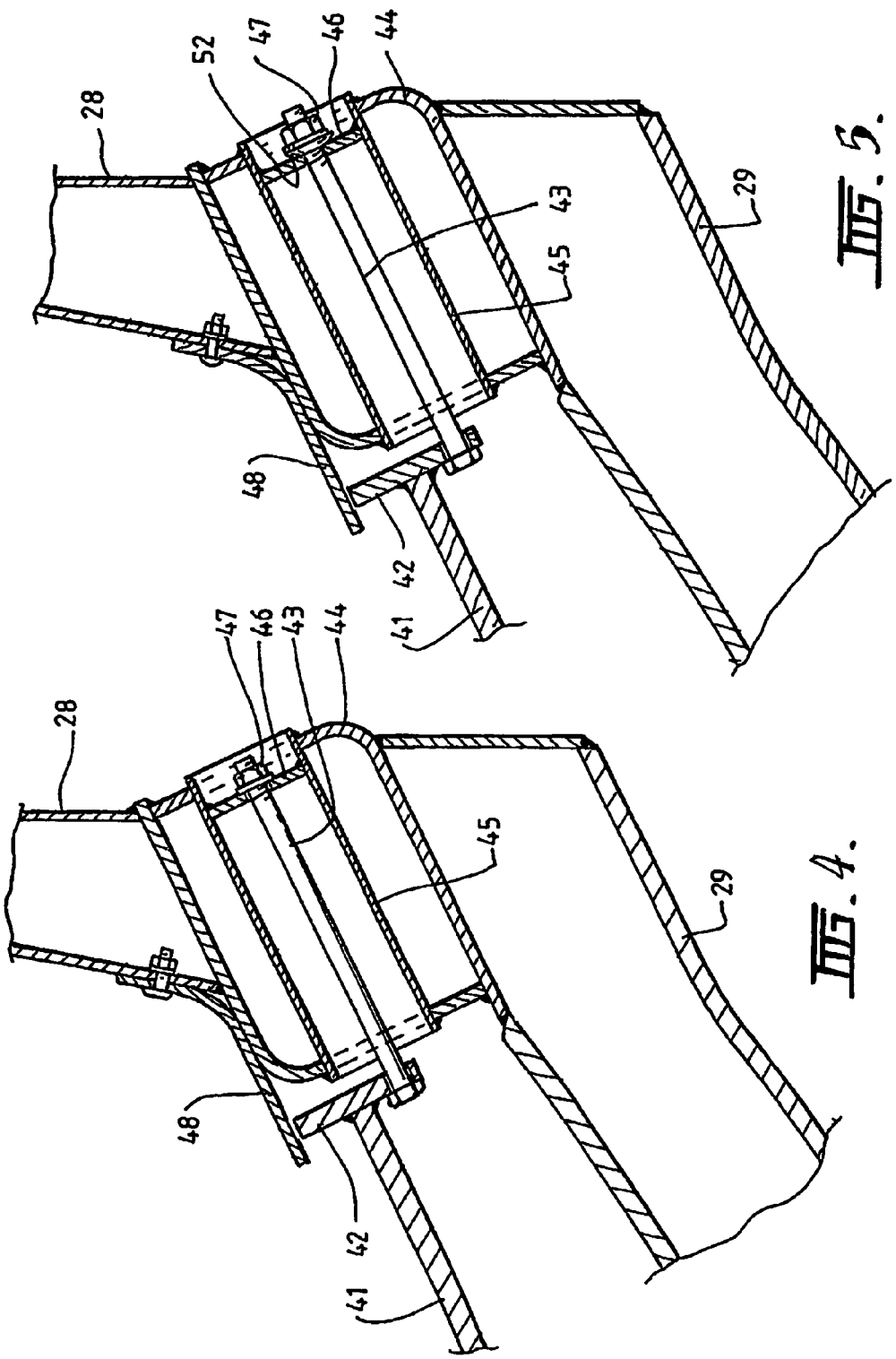

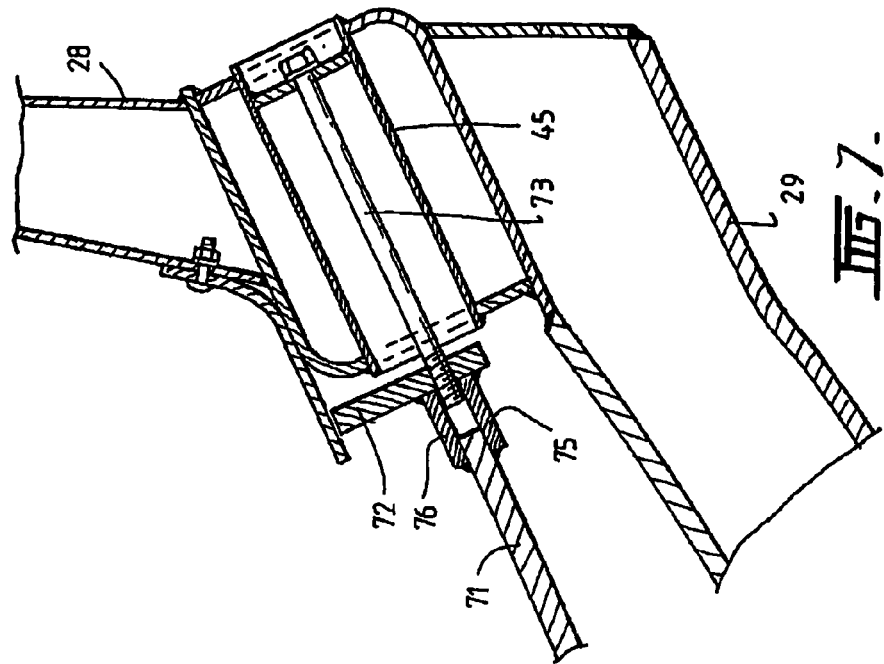
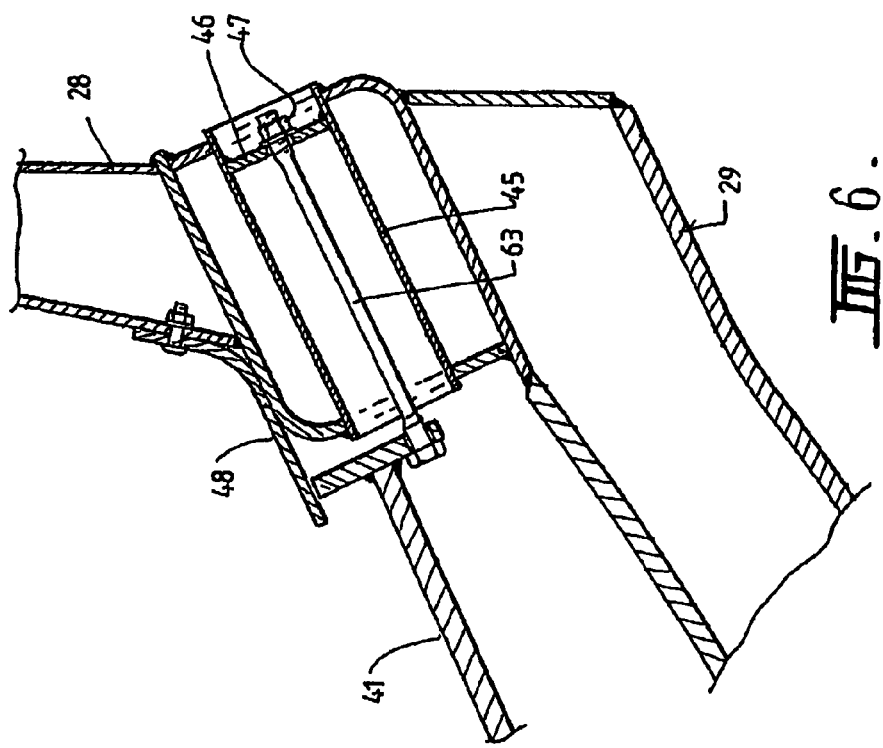

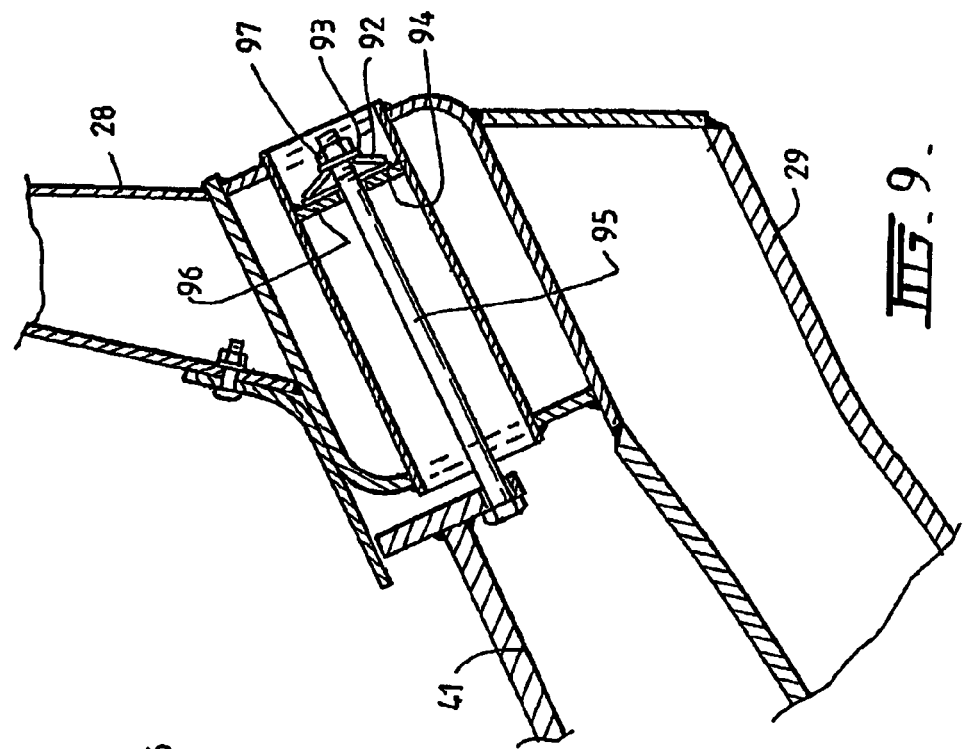
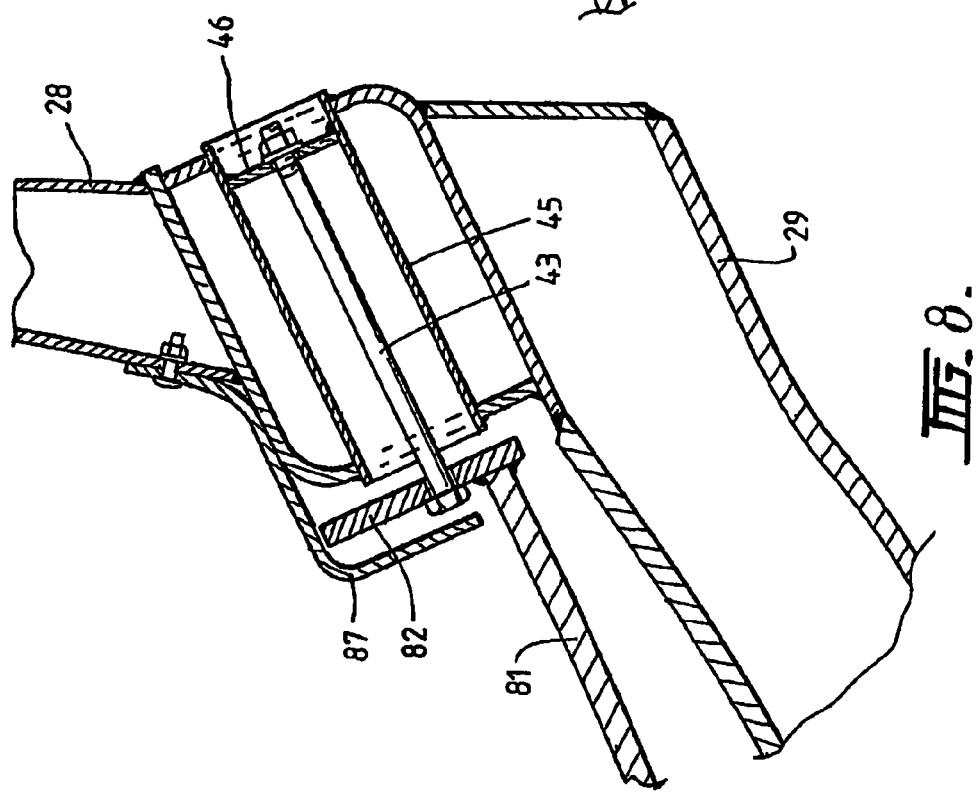

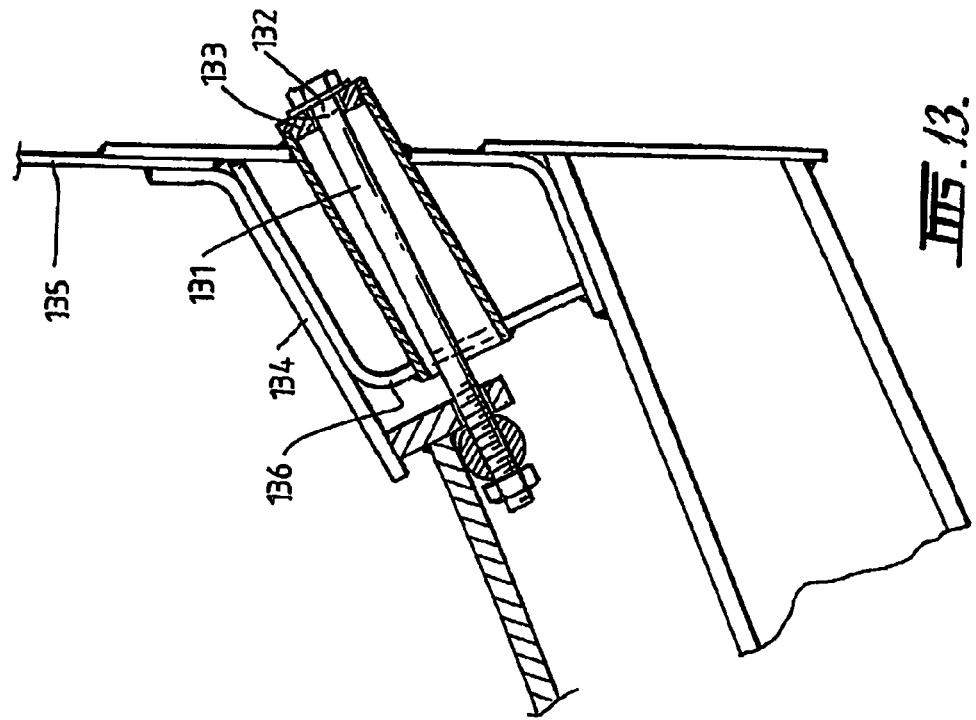
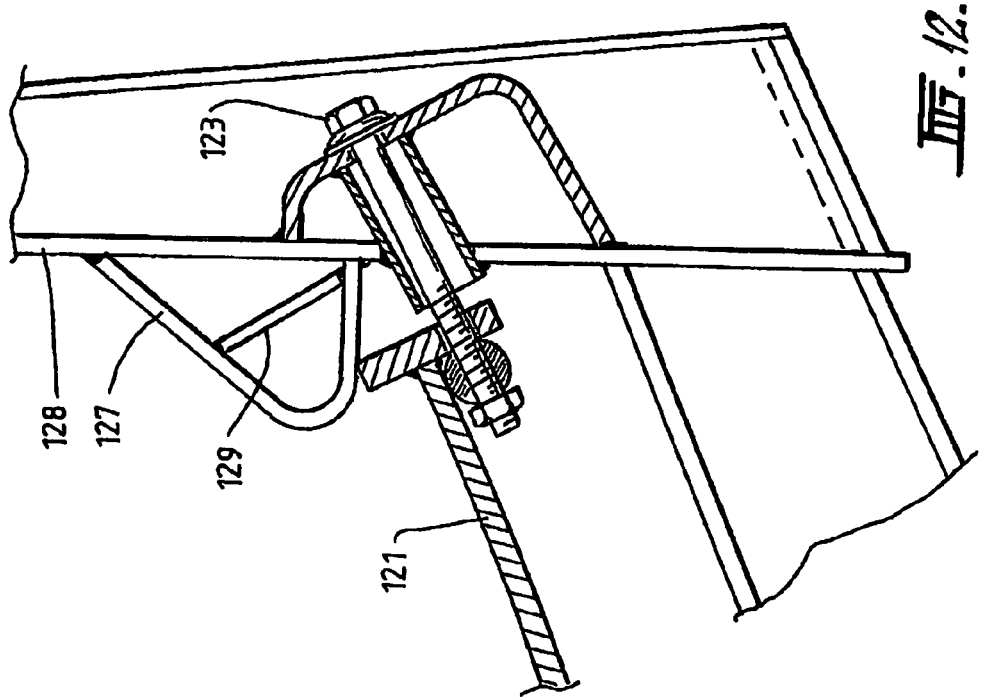

VEHICLE BODY WITH A CURVED METAL PLATE FLOOR

CROSS REFERENCE TO RELATED APPLICATIONS or PRIORITY CLAIM

This application is a national phase of International Application No. PCT/AU2006/000427 entitled "Vehicle Body With A Curved metal Plate Floor", which was filed on Mar. 30, 2006, and which claims priority of the Australia Patent Application No. 05 901546 filed Mar. 30, 2005.

FIELD OF THE INVENTION

The present invention relates to a vehicle body with a curved metal plate floor.

The present invention relates particularly, although by no means exclusively, to a system for attaching a curved metal plate floor to a frame of a load carrying body of a vehicle, such as a truck or a rail wagon.

The present invention is described hereinafter particularly in the context of trucks. However, it is emphasised that the present invention is not limited to trucks.

The floor attachment system of the present invention:
Provides for easy installation and replacement of the floor.
Allows for geometric variations between similar bodies.
Provides more uniform transference of loads from the floor to the structure of the body.
Allows for varying the flexibility of the floor by design.

The floor attachment system of the present invention is particularly suited to applications where;
The truck body floors are subject to high impact loads during the truck loading operations.
The truck body floors are subject to high abrasive wear conditions.
Replacement of the floor is required at least once during the operating life of the truck.

The above conditions typically arise in many applications of trucks used in the mining and quarrying industries. They also arise in other applications.

BACKGROUND OF THE INVENTION

In most mining and quarrying applications, the floors of truck bodies are constructed of flat plates welded into the structure.

The floor plates are welded to the sides of the body and to supporting beams on the underside of the floor plates. The floor plates are generally made from high strength abrasion resistant steels.

Mining truck bodies are typically very large. Payload capacities in excess of 100 tonnes are common and in the largest trucks, payloads are greater than 300 tonnes. During truck loading operations, loads up to about 100 tonnes may be dropped several meters directly onto the floor of the truck body.

The material loaded into mining or quarrying trucks may vary widely in nature, even in the one mine. In some applications it may be mostly large, hard, sharp cornered and very abrasive rocks. In another application the payload material may consist of smaller and softer rocks that are very abrasive. In yet another application, the payload may have a high proportion of cohesive material that sticks to parts of the body and does not shed fully from the body during load tipping operations. A mining truck body and particularly the floor must be able to handle wide variations in rock impact, abrasive wear (mainly during the load tipping/dumping operations) and cohesiveness of the material carried.

Mining trucks are typically expected to have a working life of at least 60,000 operating hours and during this time a single truck could experience about 300,000 load-haul-dump cycles.

The thickness of the steel truck body floors are typically in the range of 16 to 50 mm.

Thicknesses greater than about 25 mm are typically made up of a base plate and a high hardness wear resistant steel plate welded on top of the base plate. The top plate may be selectively placed rather than uniform over the whole area of the floor. Sometimes, spaced apart bars are used to reduce abrasive wear of the floor plate. Furthermore, numerous large supporting beams are required under these floor plates. These beams are required to prevent excessive bulging type permanent deformation of the floor when large rocks are dropped onto it.

Replacement or substantial repair of the truck body floor is typically required at least twice during the operating life of a mining truck. This repair work generally necessitates exchange of the truck body with a new or repaired body or that the truck spends a lengthy time in a workshop. The repair of truck body floors is a significant cost item for many mining trucks.

In an effort to overcome the problems and costs associated with floors made from flat steel plates, the use of suspended rubber floors in truck bodies has also become established in the mining industry. In this case, the floor consists of a single thick piece of rubber supported by numerous cables spanning between beams at the base of the side sections of the body. The cables are made of multiple strands of steel or elastomeric material.

The cables act to carry the vertical forces from the load in the body via tension in the cables similar to the way the cables of a suspension bridge carry the loads from the road section of a "suspension bridge".

The main advantages of the suspended rubber floor are:
Moist clay containing cohesive materials are less likely to stick to the body when it is tipped to dump the load.
When worn out or badly damaged, the floor can be replaced relatively quickly.
The empty weight of the body is sometimes less than for an all steel body of equivalent capacity.
The improved shedding of cohesive (sticky) materials mainly results from the flexing of the rubber floor during load tipping operations.

The disadvantages of the suspended rubber floor are:
The initial purchase cost is higher than for an all steel truck body.
Frequent re-adjustment of the floor support cables is required (to adjust for permanent stretching that occurs).
Intermittent and un-predictable replacement of failed or severely damaged cables is required.
Replacement floors are expensive.

Because of the above difficulties, the use of suspended rubber floors has been limited to less than 10% of all mining applications. Their use is mainly restricted to applications where the improved shedding of sticky materials is very important and/or where the reduction of truck empty weight is particularly critical.

Analytical modelling work and mine site trials have shown that an alternative to the above-described floors, namely suspended curved metal (typically steel and hereinafter described in that context) truck body floors, can be effective in at least the mining industry.

In any given application, a curved steel plate for a floor is rolled with a single plane of curvature. The curved steel floor plate is then supported only at the two sides of a truck body so that it curves down from the supporting points at the sides.

The curved steel floor plate provides the general load containing function and acts as a tension member to transfer the vertical forces from the load on the floor to tension forces which are transferred into beams at the base of the sides of the body. Because the curved steel floor plate carries the forces arising from the payload primarily through tension forces within the plate, it is sometimes referred to as a steel membrane floor. However, in practice the stiffness of the plate (arising from the need to provide a long life against abrasive wear), the high variability in the placement of the loads carried, the use of a single radius of curvature rather than a parabolic curvature, and eccentricity of the load transfer points on the edges of the floor, means that the curved steel floor plate is also subjected to moderate bending loads. Unless it is severely overloaded, the curved steel floor plate experiences only small changes from its initial shape. This type of floor is hereinafter described as an edge-supported curved steel plate floor.

FIG. 1 shows the principle of the edge-supported curved steel plate floor. The floor plate 11 shown in the Figure is rolled to a constant radius R. The radius need not be constant, but a constant radius of curvature provides satisfactory performance and is easier to manufacture than any other curved shape. The floor plate 11 is supported at the side edges 12 of the plate. The edge forces F that are generated by the plate 11 act tangentially to the edges of the floor plate. Because of the curvature of the floor plate, the tangent line is at an angle (θ) above the horizontal. The vertical component of the tangential forces (F×sin θ) balances the weight of the floor plate plus the payload carried by the floor plate.

The edge-supported curved steel plate floor provides the potential for:

A lower empty truck weight without increasing the manufacturing cost for the truck.

Rapid, low cost replacement of the truck body floor.

Improved shedding of cohesive (sticky) materials compared to the conventional rigid all steel bodies.

Compared to the suspended rubber floor, an edge-supported curved steel plate floor better absorbs concentrated impact loads within itself. Consequently, impact induced concentrations in the forces within the supporting system at the sides of the floor plate are much lower than for the supporting cables of a suspended rubber floor system.

Several edge-supported curved steel plate floors have performed successfully in extended mine site trials during 1996 and 1997. These floor systems were for a large rear dump mining truck with a rated payload capacity of approximately 180 tonnes.

The general cross sectional configuration and the edge connection configuration of curved steel plate floors used in the trials are shown in FIGS. 2 and 3.

The radius of curvature of the floor plates was approximately 1.1 times the width between the edge supports.

FIG. 2 shows a generalised cross-section through a truck body with an edge-supported curved steel plate floor 11.

With reference to FIG. 2, the body includes an array of transverse beams 29 and longitudinal beams 30 that are welded together and a pair of opposed box section side beams 23 that are supported by the transverse beams 29. The longitudinal beams 30 maintain the spacing between the central portions of the transverse beams 29. They also transfer the loads from the body to the chassis of the truck. The body also includes upstanding sides 28 extending from the side beams 23.

FIG. 3 shows the attachment system for the curved steel plate floor 11 shown in FIG. 2 in larger detail.

With reference to FIG. 3, the floor attachment system includes an abutment block 21 welded to the floor plate 11. The abutment block 21 bears against a round bar 22 that is attached to the box section side beam 23 of the body via a formed support plate 24 and brackets 25. The floor plate 11 is further retained (in the downwards direction) by retainer blocks 26. These retainer blocks are also welded to the side beam 23. The retainer blocks 26 also provide support for corner plates 27 which attach to the sides 28 of the body and prevent payload material from passing into and through the floor attachment system.

In most applications and particularly in mining truck applications, it is desirable to have the largest practical radius of curvature for the floor plate so that the centre of gravity for the payload is as low as possible because increasing the height of the centre of gravity for the payload reduces the stability of the truck and increases the stresses on many of the truck components during cornering, braking etc.

Table 1 set out below illustrates how the radius of curvature of an edge-supported curved metal plate floor affects the height of the payload centre of gravity.

TABLE 1

Effects of Changing Radius of Curvature of Floor Plates

| R/W | Θ | F/(Wp + Wf) | h/w | Increased height of Payload Centre of Gravity |
|---|---|---|---|---|
| 1.0 | 30.0° | 1.00 | 0.134 | C + 0.043 w |
| 1.1 | 27.04° | 1.10 | 0.120 | C + 0.039 w |
| 1.2 | 27.62° | 1.20 | 0.109 | C + 0.036 w |
| 1.3 | 22.62° | 1.30 | 0.100 | C + 0.033 w |
| 1.4 | 20.93° | 1.40 | 0.092 | C + 0.030 w |
| 1.5 | 19.47° | 1.50 | 0.086 | C + 0.029 w |

The height change shown in Table 1 is referenced to that for a flat plate floor positioned on top of straight transverse beams having the same depth as the transverse beams for the frame that supports the edge-supported curved steel plate floor. In the design used for the above mentioned mine site trials, the clearance "C" corresponded to approximately 0.03 W. This clearance is required to allow for substantial elastic deflection of the floor plate that can occur under severe localised loading impacts, for example when a very large rock is dropped from a height of several meters directly onto the floor plate.

Table 1 also shows how the radius of curvature for the curved metal plate floor affects the mean edge supporting force. Higher edge supporting forces mean higher stresses in the floor plate, higher loads in the edge attachment system, higher loads in the longitudinal beams along the sides of the body, and higher loads in the transverse beams under the floor plate.

The design radius of curvature of the curved steel floor plate is a trade-off between the payload centre of gravity height and forces in the floor plate, the attachment system and the supporting structure. It may be possible to increase the radius of curvature beyond 1.1 W when more experience is gained with this type of floor system. With this experience, it may also be possible to reduce the clearance "C" below what has been used to date.

The shape of the curved steel floor plate varies from the initial static unloaded condition depending on the load it carries. Besides the changes in loading that occur for the static truck condition, other changes occur during loading (when large localised dynamic impact loads can occur), during travel of the truck over uneven ground and during tipping of the load. These changes of loading in the floor plate and the shape of the floor plate make it desirable that the connections between the floor plate and the beams at the base of the side sections of the body are "hinged" joints. If the curved steel plate floor was rigidly attached to the beams at the base of the side sections of the body, this would prevent the steel plate from functioning as a flexible member and also it would cause strongly varying bending stresses at this joint. If for example the attachment was some form of welded connection, besides destroying the desired flexibility in the floor plate, the varying bending stresses in the welded joint would be likely to cause fatigue failures in the welded joint. A welded joint would also make replacement of the floor plate much more difficult, much more time consuming and significantly more expensive.

The attachment system shown in FIGS. 2 and 3 was found to be effective in the above-mentioned trials. The offset between the contact zone on the abutment attached to the floor plate and the centre-line of the floor plate creates a bending moment in the floor plate. For the geometry of FIG. 3, the peak magnitude of the resulting bending stresses are about 10 times the magnitude of the average tensile stress arising from the tension in the floor plate that is generated by the payload plus self weight of the curved steel floor plate. Provided the abutment attached to the floor plate makes reasonably uniform contact with the round bar, this is not a problem because the average tension generated tensile stresses in the floor plate are generally low, for example about 15 Mpa, and the floor plate is made of hard wear resistant steel with a tensile strength generally in the range of 1200 to 1600 Mpa. The average tensile stresses at the sides of the floor plate are low because the plate must be thick enough to provide good dent resistance against impacts from large rocks during the truck loading process and to provide for wear that occurs during load tipping operations. The wear is generally greatest near the central rear sections of the floor plate, not in the region of the edge connections.

However, this attachment system suffers from the cost of constructing the supports on the side beam at the base of the sides of the body and the difficulty of aligning the round bar on the beam with the bar on the floor plate during manufacture. High stress concentrations and subsequent failure problems can occur if the contact between the two bars is strongly irregular.

In mining applications, truck bodies are subject to extreme loading conditions that can cause the floor plate and/or the supporting beams to become distorted. If this happens, the load transfer from the edge-supported curved steel floor plate to the side beams becomes concentrated at some locations rather than uniformly distributed over the full length of the support. With the attachment system of FIGS. 2 and 3, it is difficult to remedy this situation and failure of the floor attachment system can occur. Further, when replacement of the edge-supported curved steel floor plate is required, it is difficult to match the position of the round bar on the side beams to the position of the abutment bar on the new floor plate. This difficulty can cause extra costs or short life of the floor attachment system after replacement of the floor.

The feasibility of an edge-supported curved steel plate floor was demonstrated in the above-mentioned mining truck trials during 1996 and 1997. However, to date this type of truck body floor has not been commercially adopted for mining truck or other applications. The main reasons for non-adoption of this technology are:

The cost of manufacturing the attachment system between the floor plate and the frame of the body.

The difficulty of achieving a good uniform contact between the abutment bar on the floor plate and the mating round bar on the frame when replacement of the floor plate is required.

Uncertainty about the ability of this floor to shed sticky materials.

SUMMARY OF INVENTION

The present invention provides an improved system that attaches an edge-supported curved metal plate floor to a load carrying body of a vehicle, such as a truck or rail wagon.

The floor attachment system of the present invention includes a series of tensile members, preferably having an adjustable-length, that are connected directly or indirectly at opposite ends to (a) the floor plate and (b) the body of the vehicle and these tensile members are at least the principal means for transfer of forces from the floor plate to the body.

The use of tensile members in the context of the present invention is understood to mean members that allow movement of the edges of the floor relative to the rest of the truck body. This is a different mechanism to that which operates where there is rigid clamping that prevents any movement between the floor edges and the vehicle body.

Preferably the floor plate includes opposed side edges and the tensile members are connected to both side edges at spaced intervals along the edges.

Preferably the body includes opposed sides and the tensile members are connected to both sides at spaced intervals along the sides.

Preferably the floor attachment system includes an assembly for connecting the tensile members to the floor plate and to the body.

The floor connection assembly may be in the form of abutments, for example in the form of plates.

Preferably the tensile members and the connection assembly at one or both ends of the tensile members are arranged so that the tensile members carry minimal transverse load.

The tensile members may apply a tension load to the floor plate at a centre-line of the thickness of the plate.

The tensile members may apply a tension load to the floor plate at an offset to the centre-line of the thickness of the floor plate. In this case the tensile members may generate significant bending stresses in the floor plate, but will not carry significant bending loads within themselves.

The tensile members may be long threaded bolts.

The bolts may have a long un-threaded section (shank) that is reduced in diameter compared to the diameter over the threaded section. The diameter of the bolts may vary depending on the application. For large mining trucks with rated payloads in the range of 120 to 350 tonnes, bolts with thread diameters in the range of 16 to 35 mm would typically be required. For such applications, typically 40 to 80 bolts per side would be required.

The tensile members may have an unsupported length that is significantly greater than their diameter.

For example, the unsupported length may be at least 6 times the diameter of the member. The long unsupported length allows flexure of the tensile members to help accommodate any changes of alignment that may occur and to add to the flexibility of the floor system. A long unsupported length of the tensile members increases the vertical movement of the floor plate as the vertical loading on the floor plate changes. Increased vertical movement of the floor plate assists with freeing of sticky materials that would otherwise accumulate around the corners of the load carrying body.

The tensile members may be attached directly to the floor plate or they may be attached to an extension of the floor plate.

The extension to the floor plate may be in the plane of the floor plate or it may be transverse to the plane of the floor plate.

The floor plate extension may extend above and/or below the plane of the floor plate.

The tensile members may bear against pivoting members so as to minimise the transmission of bending loads into the tensile members. A pivoting member for each outer end of the tensile members will increase vertical movement of the floor plate as the vertical loading on the floor plate changes.

The tensile members may bear against spring elements at one or both ends of the members. These spring elements may be metallic or elastomeric or a combination of metal and elastomer materials.

When the centre-line of the tensile members is offset below the centre-line of the floor plate, the forces from the tensile members generate a bending moment in the floor plate that increases with the off-set and acts to increase the curvature (reduce the radius of curvature) of the floor plate as the load in the tension members increases, that is as the load carried by the floor plate increases. This increased flexing of the floor plate as load is increased will assist with shedding of sticky materials during the load dumping operations, but it will also increase the clearance "C" required to prevent excessive contact between the floor plate and the transverse beams in the supporting structure. Conversely, if the centre-line of the tension members is above the centre-line of the floor plate there will be less change of curvature of the floor plate when the load on the floor plate changes.

The ability to change the stiffness of the tensile members, the stiffness of the abutment for the tensile members, and the offset of the tensile members relative to the centre-line of the floor plate allows the flexibility of the floor plate to be adjusted by design to achieve the preferred balance between flexibility in the floor plate and the payload centre of gravity height.

The present invention also provides a load carrying body for a vehicle, the load carrying body including an edge-supported curved metal plate floor assembly that includes the above-described floor attachment system.

The present invention also provides a vehicle that includes a load carrying body with an edge-supported curved metal plate floor assembly that includes the above-described floor attachment system.

The present invention also provides a curved metal plate floor that includes the above-described system for attaching the floor at the side edges thereof to a load-carrying body of a vehicle.

BRIEF DESCRIPTION OF THE DRAWINGS

FIG. 1 shows the principle of the edge-supported curved metal plate floor, as described above.

FIG. 2 is a generalised cross-section through a truck body with an edge-supported curved metal plate floor 11 used in the trails, as described above.

FIG. 3 shows the edge connection system of FIG. 2 in larger detail.

FIGS. 4 to 13 show embodiments of a truck having a curved metal plate floor and floor attachment systems in accordance with the present invention.

DESCRIPTION OF THE EMBODIMENTS SHOWN IN THE DRAWINGS

Figure 11:
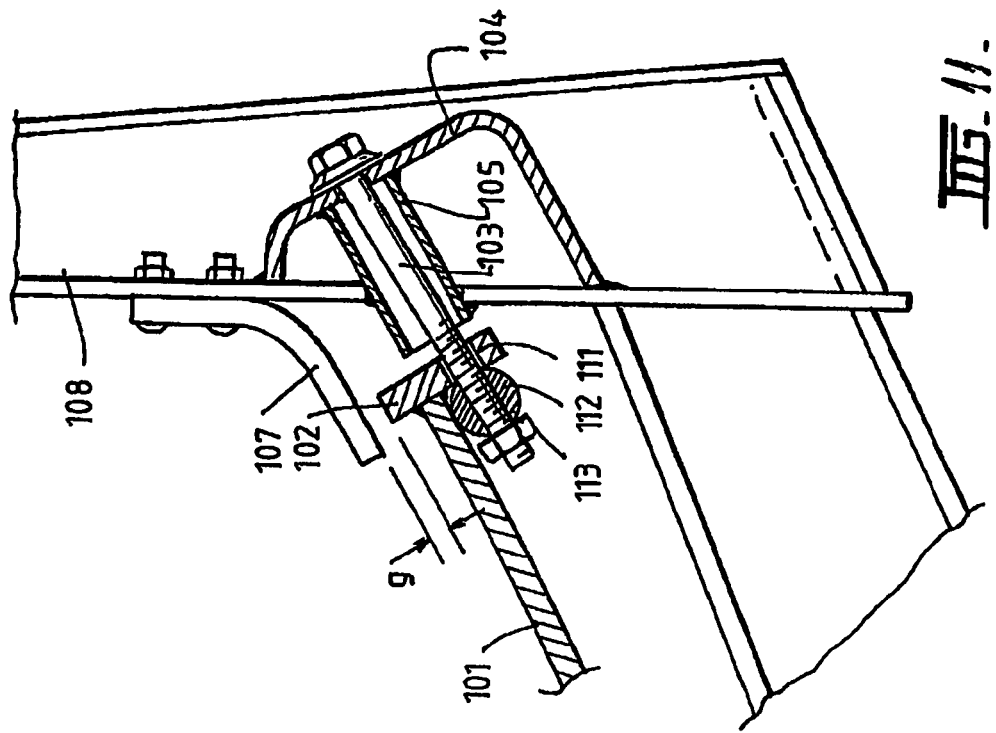

The embodiment of the floor attachment system shown in FIG. 4 includes an abutment plate 42 that is welded to an edge of a curved steel floor plate 41.

In addition, the floor attachment system includes a series of tensile members in the form of long bolts 43 (only one of which is shown in the Figure) that pass through holes in the abutment plate 42 and extend through a side beam 44 of a truck body. A series of tubes 45 (only one of which is shown in the Figure) pass through inner and outer sides of the side beam 44 and are welded to the side beam. The bolts 43 pass through the tubes 45 and through holes in a plate 46 that is welded inside each tube 45. A nut 47 on each bolt 43 bears against the associated plate 46. This configuration allows the bolts 43 and the nuts 47 to be recessed inside the tube 45. They are thereby protected from damage from falling rocks, being knocked against other objects, etcetera. The bolts 43 have sufficient threaded length to accommodate manufacturing tolerances and dimensional changes that may occur from mild damage to the body during operation of the truck. The nuts 47 are tightened to a pre-determined torque when the floor plate 41 is installed in the truck body frame. Re-tightening of the nuts 47 may be carried out during the operating life of the floor plate 41. The nuts 47 may be a self-locking type or may be backed up by locking nuts (not shown). The corner plate 48 is extended over an upward extension of the abutment plate 42 to prevent escape of payload material past the floor attachment system and to provide a limit for upwards movement of the floor plate.

In the embodiment shown in FIG. 5, a pivot plate 52 is inserted between each nut 47 and the plate 46. The pivot plate 52 allows the bolts 43 to pivot more freely about this abutment, particularly in the vertical plane. The pivot plate 52 may be round in shape and associated with just one bolt, or it may be in the form of a bar that connects between two or more bolts 43.

In the embodiment shown in FIG. 6, the bolts 63 are reduced in diameter over much of their length. This reduces the bending stiffness of the bolts so that they can more readily accommodate changes in alignment arising from manufacturing variations and changes in the shape of the floor plate 41 during operation of the truck.

In the embodiment shown in FIG. 7 the line of action for the tensile members (bolts 73) aligns with the centre of the floor plate 71. The bolts 73 engage with a mating thread in an abutment plate 72 that is attached to the floor plate 71 via plates 75 and 76. This arrangement minimises bending loads in the floor plate 71.

In the embodiment shown in FIG. 8 the bolts 43 are above the centre-line of the floor plate 81. In this case the abutment plate 82 generates a bending moment in the floor plate 81 that tends to reduce the deflection of the floor plate as the tension load in the bolts 43 increases. The corner plate 87 is extended to protect the bolt head against damage from the payload materials.

In the embodiment shown in FIG. 9 a spring 92 is inserted between each nut 97 and the plate 96. Hardened washers 93 and 94 are inserted between the spring 92 and the nut 47 and also between the spring 92 and the plate 96 to prevent the edges of the hardened steel spring 92 digging into the nut 47 or the plate 96. The nut 97 may be a self-locking type or it may be backed up by a locking nut (not shown). The single conical or "Belleville" spring 92 shown in this diagram may be replaced by multiple springs of this type, a conventional wound steel spring or a block type elastomeric spring. In this arrangement, the springs 92 act to provide axial compliance in the tension member and also to provide angular compliance to minimise bending loads on the tension member 95.

Figure 10:
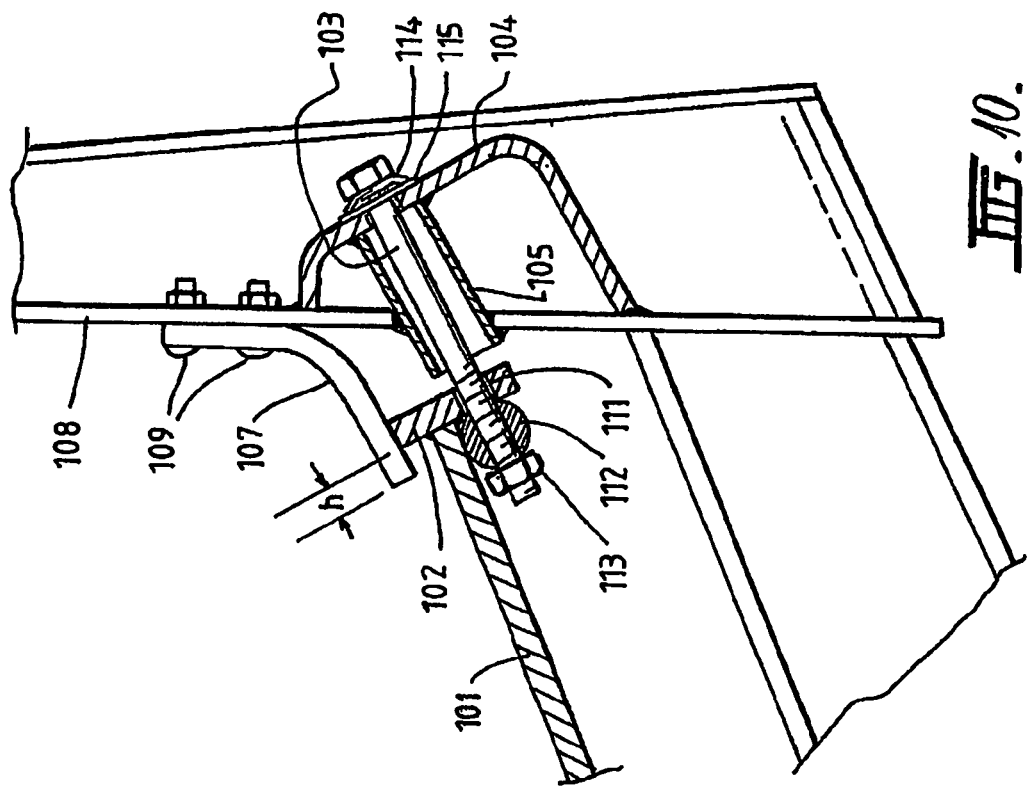

In the embodiment shown in FIGS. 10 and 11, longitudinal channel 104 is welded to the lower portion of the body side plate 108 to form a longitudinal beam. Tubes 105 (only one of which is shown in the Figures) are welded to the inside of the channel 104 and the side plate 108 where they pass through holes in the side plate. The tubes 105 stiffen the channel 104 against localised forces from the floor support bolts 103 and they also prevent ingress of dirt and water into the closed hollow space between channel 104 and the side plate 108. Abutment plate 102 is welded to the outer edge of floor plate 101 and it includes holes 111 through which bolts 103 pass. The diameter of the holes 111 is larger than the diameter of the bolts 103. Bolt 103 passes through a conical spring washer 114, a hardened flat washer 115, a hole on the channel 104, the tube 105, a hole 111 in the abutment plate and into a threaded hole on the pivot bar 112. There may be one pivot 112 per bolt 103, or each pivot bar may extend over two or more bolts.

The abutment plate 102 extends above the top surface of the floor plate 101 to the under-side of the corner plate 107. The corner plate 107 is attached to the side plate 108 by bolts 109, and it extends beyond the abutment plate by a distance h. The floor support bolts 103 are uniformly tightened to a pre-determined "set-up" torque when the floor plate is installed in the truck body frame. Generally, this set-up torque will apply only a small tension to the bolts 103. After tightening of the bolts 103 to the required torque levels, locknut 113 is tightened against the surface of the pivot bar 112, to prevent rotation of the bolts relative to the thread in the pivot bar. With a small initial tension in the bolts 103, the top of the abutment plate 102 is in light contact with the under-side of the corner plate 107. When further downward load is applied to the floor plate 101 by the payload, the compliance in the conical spring washer and other members in the floor attachment system allows the floor plate to move in a downward direction, creating a gap (g) between the top of the abutment plate 102 and the corner plate 107. This situation is shown in FIG. 11. The overhang of the corner plate beyond the inner edge of the abutment plate (h) prevents loss of payload material past this opening. The compliance of the conical spring washer and other members of the floor attachment system may be adjusted by design, depending on the type of material to be carried. For example, if the payload material is highly cohesive (sticky) the compliance may be increased to improve shedding of this material during the load dumping operations.

In the embodiment shown in FIG. 12, the corner plate is replaced by a corner channel (127). The top and bottom edges of corner channel 127 are welded to the inner surface of the side plate 128. The corner channel may be formed from flat plate by bending or rolling processes, it may be a cast component or it may be an extruded section. Channel 127 may include an internal stiffener 129 which strengthens the top surface against deformation due to impacts from falling rocks etc during the truck loading process. This configuration may be cheaper to produce than the configuration shown in FIG. 10. However, in circumstances where repair or replacement of the corner channel 127 is required during the life of the truck body, the repair or replacement costs may be higher than for the corner plate 107 which is attached by bolts.

It is not necessary to remove the corner channel 127 in order to remove or install the floor plate 121. With the tensile members 123 removed, the floor plate 121 may be removed by first lowering it away from contact with the corner channel and then moving it backwards relative to the remainder of the body. A new floor plate may be installed by reversing this process.

In the embodiment shown in FIG. 13, the freedom for pivoting of the tension members (bolts 113) is provided by part spherical washer 131 mating with a part spherical recess in seating plate 132. Both the washer and the seating plate may be made from hardened steel and the mating surfaces may be lubricated before assembly to facilitate free pivoting of the washer in the seat to reduce wear. In the embodiment shown in FIG. 13, the corner plate 134 is welded to both the body side plate 135 and the longitudinal beam 136. It may also be bolted in place as for example shown in FIG. 10.

Many modifications may be made to the preferred embodiments as described above without departing from the spirit and scope of the present invention.

The invention claimed is:

1. A system that attaches a side edge-supported curved metal plate floor to a load carrying body of a vehicle comprising a series of tensile members that are connected directly or indirectly at opposite ends of the tensile members to (a) one of the opposed side edges of the floor plate and (b) one of the opposed sides of the body of the vehicle, wherein the tensile members principally transfer forces from the floor plate to the body, and wherein the tensile members have a length that is greater than a diameter of the tensile members to allow flexture of the tensile members to accommodate changes of alignment and improve flexibility of the system.

2. The system defined in claim 1 wherein the tensile members are connected to the side edges of the floor plate at spaced intervals along the edges.

3. The system defined in claim 1 wherein the tensile members are connected to the sides of the body of the vehicle at spaced intervals along the sides.

4. The system defined in claim 1 which includes an assembly for connecting the tensile members to the floor plate and to the body.

5. The system defined in claim 4 wherein the floor connection assembly is in the form of plates.

6. The system defined in claim 4 wherein the tensile members and the connection assembly at one or both ends of the tensile members are arranged so that the tensile members carry minimal transverse load.

7. The system defined in claim 1 wherein the tensile members apply a tension load to the floor plate at a centre-line of the thickness of the plate.

8. The system defined in claim 1 wherein the tensile members apply a tension load to the floor plate at an offset to the centre-line of the thickness of the floor plate.

9. The system defined claim 1 wherein the tensile members are threaded bolts.

10. The system defined in claim 9 wherein the bolts have a long un-threaded section that is reduced in diameter compared to the diameter over the threaded section.

11. The system defined in claim 9 wherein, for mining trucks with rated payloads in the range of 120 to 350 tonnes, the bolts have thread diameters in the range of 16 to 35 mm.

12. The system defined in claim 11 includes 40 to 80 bolts per side of the floor plate.

13. The system defined in claim 1 wherein the length is unsupported by the floor plate or the vehicle.

14. The system defined in claim 1 wherein the tensile members are attached to an extension of the floor plate.

15. The system defined in claim 14 wherein the extension to the floor plate is in a plane of the floor plate or transverse to the plane of the floor plate.

16. The system defined in claim 1 wherein the tensile members bear against pivoting members so as to minimise the transmission of bending loads into the tensile members.

17. The system defined in claim 1 wherein the tensile members bear against spring elements at one or both ends of the members.

18. A load carrying body for a vehicle, the load carrying body including an edge-supported curved metal plate floor assembly that includes the floor attachment system defined in claim 1.

19. A curved metal plate floor that includes the system as defined in claim 1 for attaching the floor at the side edges thereof to a load-carrying body of a vehicle.

* * * * *